UNITED STATES PATENT OFFICE.

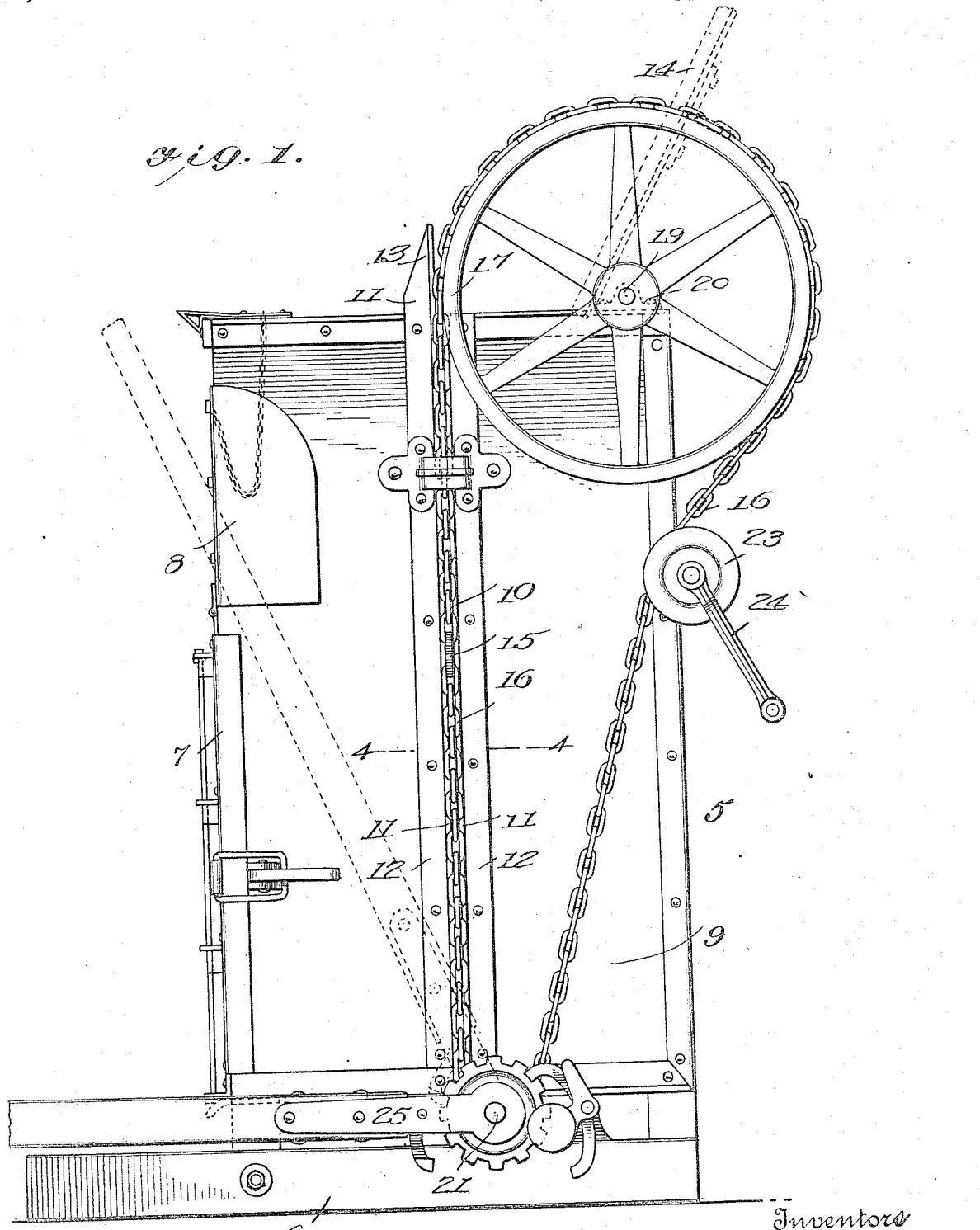

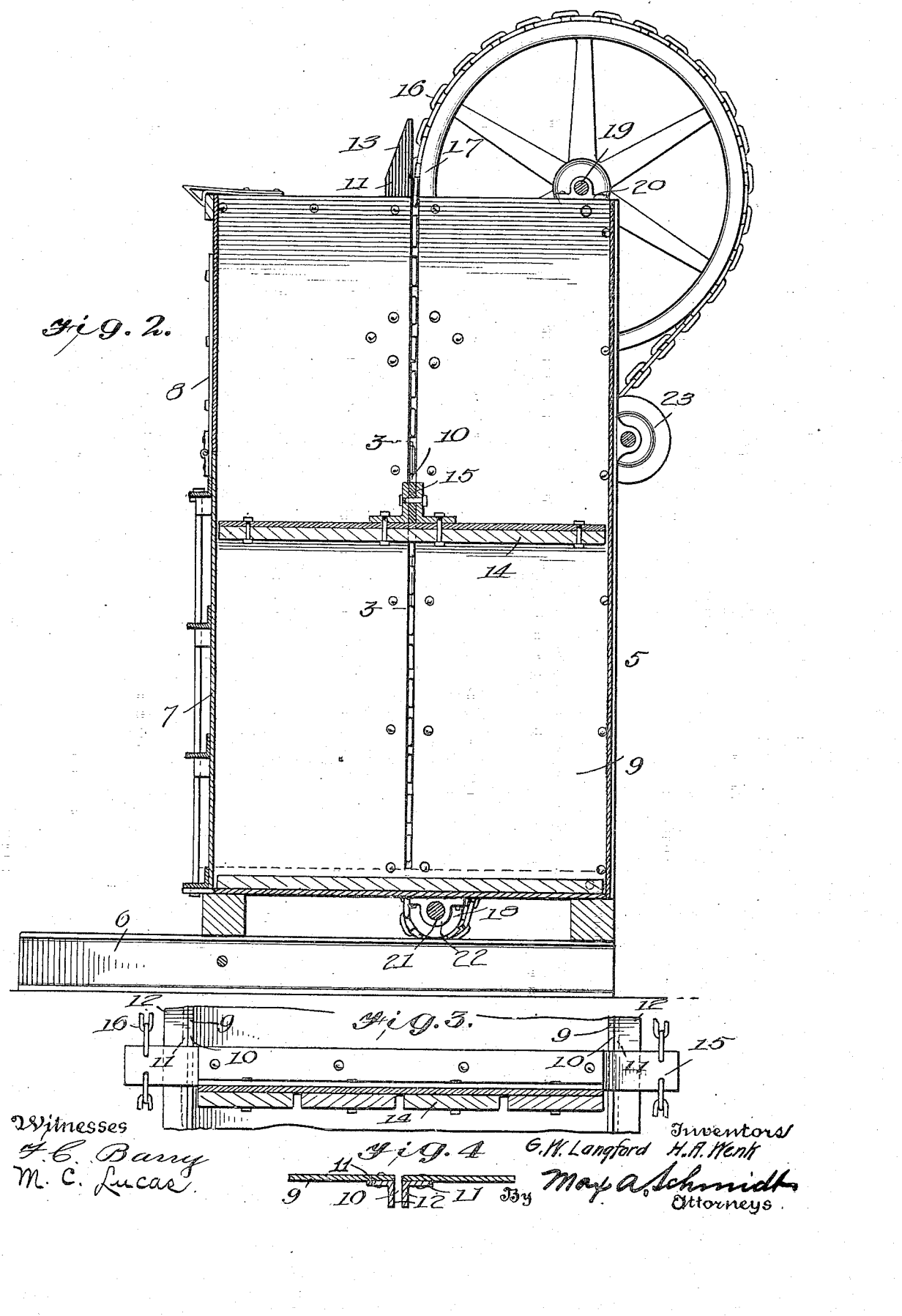

GEORGE W. LANGFORD AND HENRY A. WENK, OF ANN ARBOR, MICHIGAN, ASSIGNORS TO ECONOMY BALER COMPANY, OF ANN ARBOR, MICHIGAN, A CORPORATION OF MICHIGAN.

BALING-PRESS.

1,127,650. Specification of Letters Patent. Patented Feb. 9, 1915.

Application filed June 16, 1913, Serial No. 773,909. Renewed July 15, 1914. Serial No. 851,229.

*To all whom it may concern:*

Be it known that we, GEORGE W. LANGFORD and HENRY A. WENK, citizens of the United States, residing at Ann Arbor, in the county of Washtenaw and State of Michigan, have invented certain new and useful Improvements in Baling-Presses, of which the following is a specification.

This invention relates to presses for baling waste-paper and other material, and its object is to mount the plunger of the press in such a manner that it may be run to the top or entrance to the baling chamber and folded back, leaving the entrance to the baling chamber completely open, so that the material to be baled can be dropped directly into the baling chamber from above.

This object is attained by means of a novel combination and arrangement of parts to be hereinafter described and claimed, reference being had to the accompanying drawings in which—

Figure 1 is a side elevation of the press; Fig. 2 is a cross-section thereof; Fig. 3 is a cross-section on the line 3—3 of Fig. 2, and Fig. 4 is a horizontal section on the line 4—4 of Fig. 1.

Referring specifically to the drawings, 5 denotes the baling chamber of the press, the same being mounted on a suitable base 6. The baling chamber has a front door 7 carrying a hinged top section 8, and the side walls 9 of the chamber are constructed so that a vertical slot 10 is had in each of said walls, the slots of the two walls being in alinement and extending from the top to the bottom of said walls. The material to be baled is thrown into the chamber from the top thereof, and the latter is therefore left open, and the slots are continued through the top edge of the side walls, which is for a purpose to be presently pointed out. Each side wall is composed of two metal plates which are placed side by side, with their opposite vertical edges spaced apart to form the slot, and secured to one of the flanges 11 of angle irons, the other flanges 12 of which project outward and come flush with the spaced vertical edges of the end plates, in view of which said flanges are spaced apart, and, with the space between the end plates, produce the aforementioned side wall slots. One of the angle irons extends a short distance above the top of the baling chamber, as indicated at 13.

In the baling chamber is mounted a reciprocatory plunger 14 on the back of which is rigidly secured a cross-beam 15 of sufficient length so that its ends may project through the slots 10 to the outside of the baling chamber. Adjacent to the side walls, outside the baling chamber, are located endless chains 16, to which the projecting ends of the beam 15 are made fast. The chains are arranged to run opposite and parallel to the slots, in view of which it will be evident that the plunger is operated when the chains are put in motion. The beam 15 is connected to the chains 16 by removing one or more links thereof to form a gap in the chains, and then hooking the end links of the chains into apertures in the ends of the beam as shown in Fig. 3. The chains 16 pass over top and bottom sprocket wheels 17 and 18, respectively. The top sprocket wheels are mounted on a transverse shaft 19 journaled in bearings 20 mounted on the top of the side walls 9. The bottom sprocket wheels are mounted on a transverse shaft 21 extending beneath the bottom of the baling chamber, and journaled in suitable bearings 22.

Any suitable means may be provided for operating the chains 16. Sprocket wheels 23, provided with a crank handle 24, are shown for operating the chains to raise and lower the plunger 14, and for the final compression, a ratchet-lever 25 is provided, said lever operating the shaft 21. Various other operating means will suggest themselves to those skilled in the art to which the invention pertains.

The shaft 19 is set back close to the rear wall of the baling chamber, which necessitates large sprocket wheels 17 in order to bring the chains 16 in line with the slots. The location of the shaft 19 rearward, as stated, also leaves the top of the baling chamber open and unobstructed so that the plunger 14 may pass out of the same and swing back as shown by dotted lines in Fig. 1. Thus, the top of the baling chamber is left open, and the material to be baled may be thrown in from above. The upper portions of the sprocket wheels 17 rise some distance from the top of the baling chamber, in view of which the plunger, as it follows the chains, is elevated above the top of the baling chamber and swings back when the cross beam 15 passes to the rear of the vertical center line of the sprocket wheels 17. When the chains are run in the opposite direction, the plunger swings downward and reënters the baling chamber and is lowered thereinto. The upstanding parts 13 serve to guide the cross beam 15 into the slots 10.

The preferred embodiment of the invention has been shown, but it will be evident that various changes and modifications in the structural details may be made without departure from the scope of the invention as hereinafter claimed.

We claim:

1. In a baling press, the combination of a casing having an open end, a follower board to fit within the casing and movable therein through its open end, a shaft extending across one side of the casing adjacent to the open end thereof, means for moving the follower board in the casing, and means on said shaft for turning the follower board out of the open end of the casing about the axis of said shaft with its edge adjacent to the shaft.

2. A baling press comprising a baling chamber open at the material entrance and having slotted opposite walls, the slots of said walls opening into the entrance, a plunger in the chamber, chains having portions extending opposite and parallel to the slots, a connection between the plunger and the chains, said connection passing through the slots, sprocket wheels over which the chains pass, one set of said sprocket wheels having portions which extend beyond the aforesaid entrance and forming guides engageable by the plunger connection to tilt the plunger out of the material entrance, and means for operating the chains to actuate the plunger.

3. A baling press comprising a baling chamber open at the material entrance and having slotted opposite walls, the slots of said walls opening into the entrance, a plunger in the chamber, chains having portions extending opposite and parallel to the slots, a projection carried by the plunger and connected at its ends to the chains, said projection passing through the slots, sprocket wheels over which the chains pass, one set of sprocket wheels extending beyond the aforesaid entrance and forming guides engageable by the aforesaid projection to tilt the plunger out of the material entrance, and means for operating the chains to actuate the plunger.

4. A baling press comprising a baling chamber open at the material entrance and having slotted opposite walls, the slots of said walls opening into the entrance, a plunger in the chamber, chains having portions extending opposite and parallel to the slots, a projection carried by the plunger and connected at its ends to the chains, said projection passing through the slots, sprocket wheels over which the chains pass, one set of sprocket wheels extending beyond the aforesaid entrance and forming guides engageable by the aforesaid projection to tilt the plunger out of the material entrance, means for operating the chains to actuate the plunger, and a guide at the entrance ends of the slots to guide the projection thereinto.

5. A baling press comprising an upright baling chamber open at the top to form the material entrance and having vertical slots in opposite walls opening through the top of said walls, a plunger in the chamber, chains having portions extending opposite and parallel to the slots, a connection between the plunger and the chains, said connection passing through the aforesaid slots, top and bottom sprocket wheels over which the chains pass, the top sprocket wheels extending above the top of the baling chamber and forming guides engageable by the plunger connection to tilt the plunger out of the material entrance, and means for operating the chains to actuate the plunger.

6. A baling press comprising an upright baling chamber open at the top to form the material entrance and having vertical slots in opposite walls, angle irons secured to said walls and having outstanding flanges which are spaced apart, the spaces between said flanges registering with the aforesaid slots, a plunger in the chamber, a projection carried by the plunger and extending at its ends through the slots and the spaces between the aforesaid outstanding flanges, chains having portions extending opposite and parallel to the slots, to which chains the ends of the cross beam are connected, top and bottom sprocket wheels over which the chains pass, the top sprocket wheels extending above the top of the baling chamber and forming guides engageable by the aforesaid projection to tilt the plunger out of the material entrance, and means for operating the chains to actuate the plunger.

7. A baling press comprising an upright baling chamber open at the top to form the material entrance and having vertical slots in opposite walls, angle irons secured to said walls and having outstanding flanges which are spaced apart, the spaces between said flanges registering with the aforesaid slots, the outstanding flanges of one of the angle irons of the side walls rising above the top of said walls, a plunger in the chamber, a projection carried by the plunger and extending at its ends through the slots and the spaces between the aforesaid outstanding flanges, chains having portions extending opposite and parallel to the slots, to which chains the ends of the projection are connected, top and bottom sprocket wheels over which the chains pass, the top sprocket wheels extending above the top of the baling chamber and forming guides engageable by the aforesaid projection to tilt the plunger out of the material entrance, and means for operating the chains to actuate the plunger.

8. A baling press comprising an upright baling chamber open at the top to form the material entrance and having vertical slots in opposite walls opening through the top of said walls, a plunger in the chamber, a projection carried by the plunger and extending at its ends through the aforesaid slots, chains having portions extending opposite and parallel to the slots, to which chains the ends of the projection are connected, top and bottom sprocket wheels over which the chains pass, the top sprocket wheels extending above the top of the baling chamber and forming guides engageable by the aforesaid connection to tilt the plunger out of the material entrance, and means for operating the chains to actuate the plunger.

9. A baling press comprising an upright baling chamber open at the top to form the material entrance and having vertical slots in opposite walls opening through the top of said walls, a plunger in the chamber, a projection carried by the plunger and extending at its ends through the aforesaid slots, chains having portions extending opposite and parallel to the slots, to which chains the ends of the projection are connected, top and bottom sprocket wheels over which the chains pass, the top sprocket wheels extending above the top of the baling chamber and forming guides engageable by the aforesaid projection to tilt the plunger out of the material entrance, means for operating the chains to actuate the plunger, and means at the top of the slotted walls for guiding the projection into the slots.

10. A baling press comprising a baling chamber having an open end, a plunger in the chamber movable into and out of the same at its open end, chains, a connection between the plunger and the chains, and sprocket wheels at the open end of the chamber, said sprocket wheels having portions which extend from said end and form guides engageable by the plunger connection to tilt the plunger out of said end.

In testimony whereof we affix our signatures in presence of two witnesses.

GEORGE W. LANGFORD.
HENRY A. WENK.

Witnesses:
M. I. RIDENOUR,
A. E. BARROWS.